(12) United States Patent
Looy et al.

(10) Patent No.: US 12,502,931 B2
(45) Date of Patent: Dec. 23, 2025

(54) MOTORIZED HVAC VENT SYSTEM

(71) Applicant: UUSI, LLC, Reed City, MI (US)

(72) Inventors: Bradley D. Looy, Big Rapids, MI (US); Richard L. Felicioni, Ada, MI (US); David W. Shank, Hersey, MI (US)

(73) Assignee: UUSI, LLC, Reed City, MI (US)

( * ) Notice: Subject to any disclaimer, the term of this patent is extended or adjusted under 35 U.S.C. 154(b) by 564 days.

(21) Appl. No.: 17/963,758

(22) Filed: Oct. 11, 2022

(65) Prior Publication Data

US 2023/0111256 A1    Apr. 13, 2023

Related U.S. Application Data

(63) Continuation-in-part of application No. 17/952,736, filed on Sep. 26, 2022.

(60) Provisional application No. 63/254,003, filed on Oct. 8, 2021.

(51) Int. Cl.
*B60H 1/00* (2006.01)
*B60H 1/34* (2006.01)

(52) U.S. Cl.
CPC ..... *B60H 1/00871* (2013.01); *B60H 1/00742* (2013.01); *B60H 2001/3471* (2013.01)

(58) Field of Classification Search
CPC ............ B60H 1/00742; B60H 1/00835; B60H 1/00871
See application file for complete search history.

(56) References Cited

U.S. PATENT DOCUMENTS

| | | | |
|---|---|---|---|
| 10,723,198 B2 | 7/2020 | Freese et al. | |
| 11,091,009 B2 | 8/2021 | Skapof et al. | |
| 11,345,211 B2 | 5/2022 | Skapof | |
| 2015/0328958 A1* | 11/2015 | Winget, Jr. | B60H 1/00742 454/155 |
| 2018/0056758 A1* | 3/2018 | Salter | A61L 9/205 |
| 2018/0345762 A1* | 12/2018 | Bauer | B01D 53/0407 |
| 2019/0283546 A1* | 9/2019 | Schlegelmilch | B60H 3/0035 |
| 2019/0322154 A1* | 10/2019 | Ganguly | B60H 1/00742 |
| 2020/0047593 A1* | 2/2020 | Lee | B60H 1/3421 |

(Continued)

FOREIGN PATENT DOCUMENTS

| | | | | |
|---|---|---|---|---|
| WO | WO-2016198307 A1 * | 12/2016 | | B60H 1/00642 |
| WO | 2020/102255 A2 | 5/2020 | | |

OTHER PUBLICATIONS

Holmes, Jake, Kia, MIT to show a car interior that adapts to your mood at CES, (Dec. 10, 2018), CNET: Cars. Retrieved Aug. 17, 2022, from CNET Web site: https://www.cnet.com/roadshow/new/kia-mit-mood-adaptive-concept-ces/.

*Primary Examiner* — Steven S Anderson, II
(74) *Attorney, Agent, or Firm* — Howard & Howard Attorneys PLLC

(57) ABSTRACT

A system and method for controlling motorized vents of an HVAC system of a vehicle including at least one motor to move air louvers of an HVAC vent of the HVAC system, a position and motion control for controlling movement of the at least one motor, and one or more sensors to detect hot/cold areas and send information on the detected hot/cold areas to the position and motion control, wherein the position and motion control automatically determines a targeted positioning of airflow based on hot/cold areas.

36 Claims, 4 Drawing Sheets

(56) References Cited

U.S. PATENT DOCUMENTS

2020/0156440 A1\* 5/2020 Matsuoka .......... B60H 1/00742
2022/0032731 A1 2/2022 Skapof et al.

\* cited by examiner

MOTORIZED HVAC VENT SYSTEM

CROSS REFERENCE TO RELATED APPLICATION(S)

This application is a continuation-in-part and claims the benefit of U.S. patent application Ser. No. 17/952,736, filed on Sep. 26, 2022, which claims the benefit of U.S. Provisional Patent Application No. 63/254,003, filed on Oct. 8, 2021, the disclosures of both are expressly hereby incorporated by reference.

BACKGROUND OF THE INVENTION

1. Field of the Invention

The present invention relates generally to HVAC systems for vehicles and, more particularly to, systems and methods for controlling motorized vents in an HVAC system for a vehicle and communications methods for sending and receiving data.

2. Description of the Related Art

A vehicle, such as an automobile, truck, boat, and the like, typically includes one or more user interfaces accessible by occupants such as an operator and passengers for displaying information. A user interface may also include one or more inputs that an occupant uses, or the vehicle uses, to sense and control a vehicle function or accessory like an HVAC system, a radio, a navigation system, or a phone. A user interface may also be used to control vehicle systems from portable accessories like a mobile phone or tablet.

In various types of vehicles, a user interface, such as a center stack console, is accessible to the operator and front seat passengers. The center stack has user interfaces for many vehicle functions and may include switches, knobs, light indicators, displays including touch sensitive displays, and the like. Other areas of a vehicle that may have user interfaces for sensing, control, and/or information display include overhead consoles where sunroof and interior lighting controls may be placed and rear seat controls for temperature control, entertainment systems, and the like. The particular type of user interface and its location may vary depending on the type of information displayed or accessory being controlled across a wide variety of applications.

Accordingly, it is desirable to provide a control for a motorized HVAC vent system. It is also desirable to provide a system for controlling motorized vents in an HVAC system. Therefore, there is a need in the art to provide a motorized vent control system for an HVAC of a vehicle.

SUMMARY OF THE INVENTION

Accordingly, the present invention provides a system and method for controlling motorized vents in an HVAC system of a vehicle.

The present invention also provides a system for controlling motorized vents of an HVAC system of a vehicle including at least one motor to move air louvers of an HVAC vent of the HVAC system, a position and motion control for controlling movement of the at least one motor, and one or more sensors to detect hot/cold areas and send information on the detected hot/cold areas to the position and motion control, wherein the position and motion control automatically determines a targeted positioning of airflow based on hot/cold areas.

The present invention further provides a method for controlling motorized vents of an HVAC system of a vehicle including steps of moving at least one motor to move air louvers of an HVAC vent of the HVAC system, controlling, by a position and motion control, movement of the at least one motor, and detecting, by one or more sensors, hot/cold areas and sending information on the detected hot/cold areas to the position and motion control, wherein the position and motion control automatically determines a targeted positioning of airflow based on hot/cold areas.

In addition, the present invention provides a method for controlling motorized vents of an HVAC system of a vehicle including steps of moving at least one motor to move air louvers of an HVAC vent of the HVAC system, controlling, by a position and motion control, movement of the at least one motor, and detecting, by one or more sensors, hot/cold areas and sending information on the detected hot/cold areas to the position and motion control, wherein the position and motion control determines a targeted positioning of airflow based on hot/cold areas; and wherein the position and motion control automatically initiates movement of air louvers.

Further, the present invention provides a method for controlling motorized vents of an HVAC system of a vehicle including steps of moving at least one motor to move air louvers of an HVAC vent of the HVAC system, controlling, by a position and motion control, movement of the at least one motor, and detecting, by one or more sensors, hot/cold areas and sending information on the detected hot/cold areas to the position and motion control, wherein the position and motion control determines a targeted positioning of airflow based on hot/cold areas; and wherein the position and motion control dynamically controls movement of air louvers.

In one embodiment, the present invention provides a system including a user interface system that incorporates a mechanism to control various functions and aspects of an HVAC system such as setting a desired temperature setting, fan speed, vent selection like left, center, and/or right, and location like floor, dash, or defrost positions.

These and other objects, advantages, and features of the present invention will become better understood from the following detailed description of one exemplary embodiment of the present invention that is described in conjunction with the accompanying drawings.

DESCRIPTION OF THE PREFERRED EMBODIMENT(S)

One embodiment of the present invention employs a user interface to input a desired temperature setting, fan speed, vent selection and position, and location like floor, dash, or defrost positions. The user interface devices, according to the present invention, may be used to advantage in a wide variety of applications. In vehicle applications, for example, touch sensitive user interface devices facilitate interaction with the vehicle by a mechanism of a touch screen display, by various vehicle trim components with active touch areas, as well as knobs, switches, and the like. The vehicle user may also send and receive commands and information to and from the vehicle via a mobile device such as a phone or a tablet.

Figure 1:
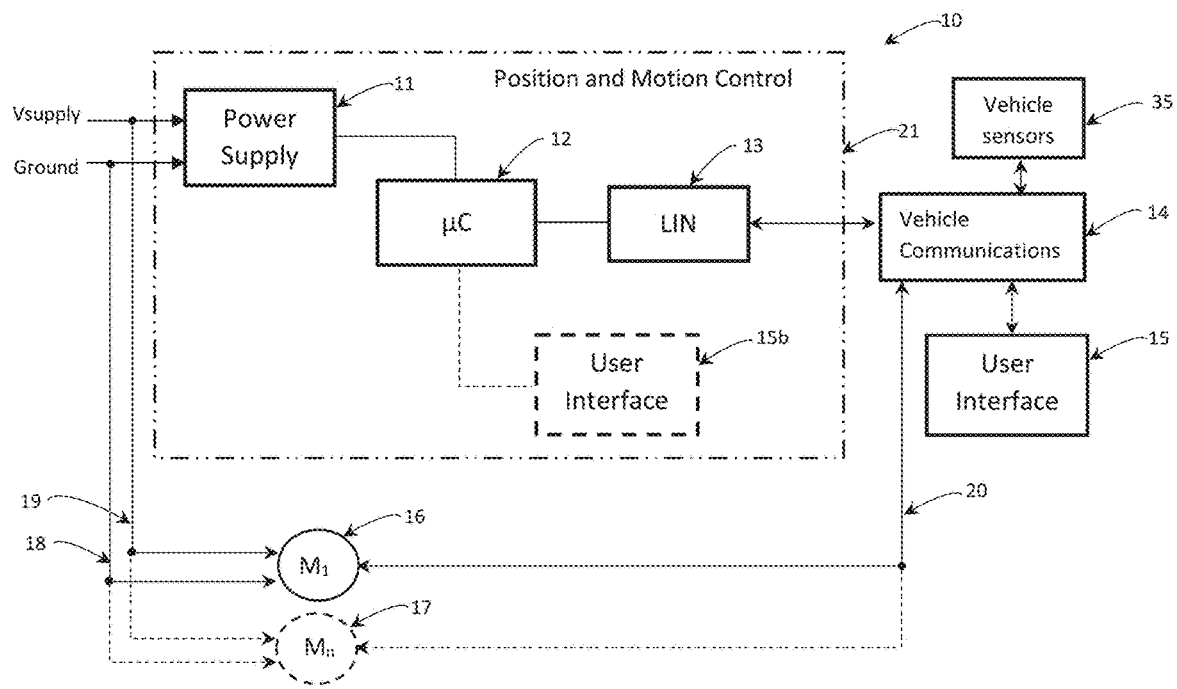
FIG. 1 is a diagrammatic view of a system, in accordance with one embodiment of the present invention, for controlling motorized vents in an HVAC system having a user interface and sensor inputs that may be used to control a vehicle accessory.

Referring to the drawings, and in particular FIG. 1, a block diagram illustrating one embodiment of a system 10, according to the present invention, is shown including a user interface 15 that provides a mechanism for a user to input data such as what radio station to listen to, what volume to play music, an HVAC temperature setpoint, a fan speed, and the like. The user interface 15 may be used to control one or more vehicle functions and vehicle accessories. The system 10 also includes vehicle communications 14 communicating with the user interface 15 and one or more vehicle sensors 35 and provides a capability or mechanism to obtain data from at least one of the vehicle sensors 35 or transfer data to another control. The system 10 includes functions that create a position and motion control 21. The position and motion control 21 includes a power supply 11, microcontroller (μC) 12, LIN communications 13, and an optional user interface 15b that may replace, or be additional to, the user interface 15. It should be appreciated that the position and motion control 21 is illustrated using LIN communications 13 protocol, but may use other communications protocols such as CAN or other advantageous method.

In one embodiment, the system 10 also includes at least one motor 16 that controls the position of a louver or vane (See FIGS. 7-11) of an HVAC vent. The at least one motor 16 has integral electronics that can interpret communications instructions from the vehicle communications 14. The at least one motor 16 is powered via Vsupply 19 and Ground 18 of the vehicle and is connected to the vehicle communication 14 via a connection mechanism 20. The at least one motor 16 receives instructions from the vehicle as to what position the at least one motor 16 should move or rotate to. For example, the microcontroller 12 of the position and motion control 21 receives input from the user interface 15 and, as a result, sends a command via the vehicle communications 14 to the at least one of motor 16 to rotate, for example, 25° in the clockwise direction. It should be appreciated that the at least one motor 16 interprets the communications instruction and rotates the proper amount and direction.

Figure 2:
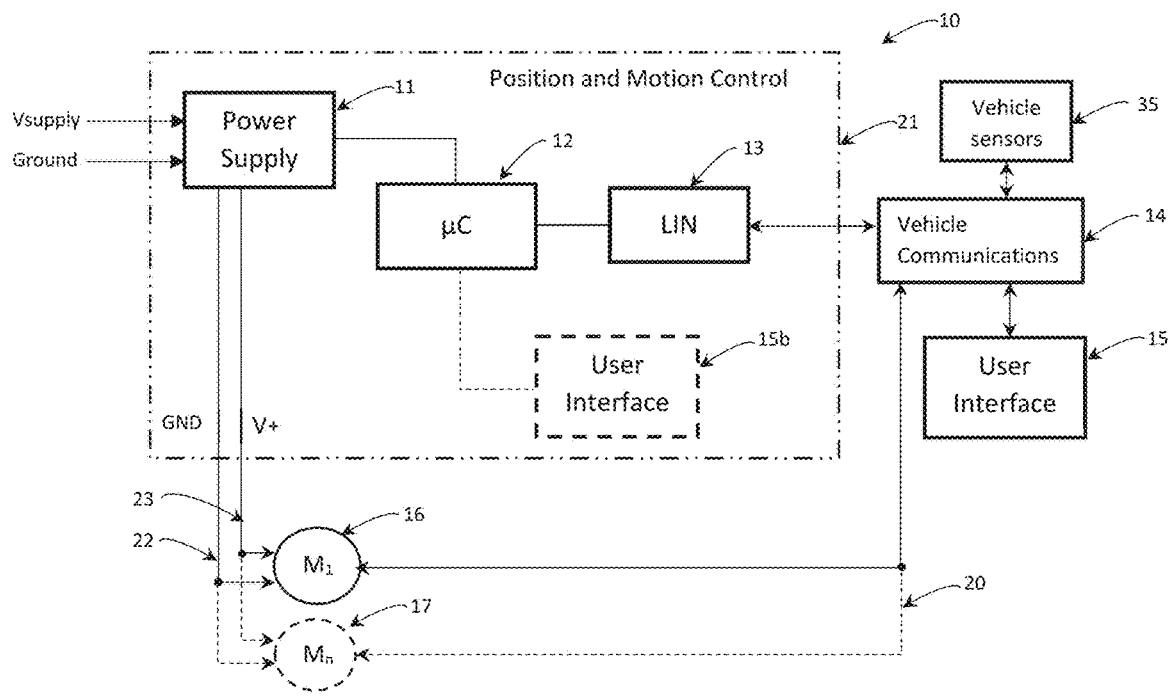
FIG. 2 is a diagrammatic view of a system, in accordance with one embodiment of the present invention, for controlling motorized vents in an HVAC system having a user interface and sensor inputs that may be used to control a vehicle accessory.

Referring to FIG. 2, in another embodiment of the system 10 of FIG. 1, power is supplied to the at least one motor 16 from the power supply 11 of the position and motion control 21 instead of direct connection to the vehicle power source. The power and ground are supplied via connections V+ 23 and GND 22. In some circumstances, it may be required to power the motors 16, 17 for the air louvers of the HVAC vent from the position and motion control 21 to provide a voltage that is not available or not regulated appropriately when connected directly to the vehicle. It should be appreciated that powering the motors 16, 17 directly from the position and motion control 21 also allows for drive electronics to be in the position and motion control 21 instead of integrated into each motor 16, 17.

Figure 3:
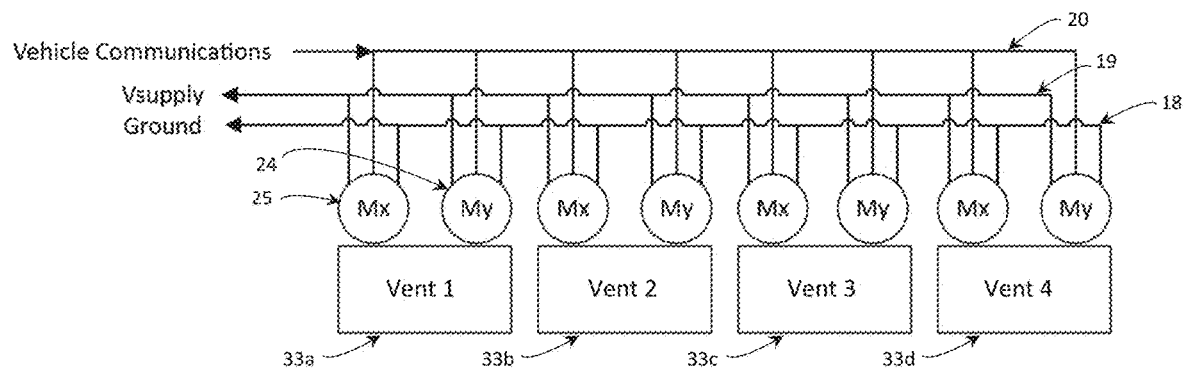
FIG. 3 is a diagrammatic view illustrating one configuration of the system for powering and controlling louver motors in a vehicle HVAC vent system in accordance with an embodiment of the present invention.

Referring now to FIG. 3, the system 10 may include a plurality of motors to accomplish various tasks. For example, in one embodiment, the system 10 may include two (2) motors attached to each HVAC vent in a dashboard of the vehicle. In one embodiment, a first motor 24 moves the air louvers or vanes in the y axis or up and down and a second motor 25 on each HVAC vent would move the air louvers or vanes in the x axis or left and right. With four (4) vents 33a-33d on a dashboard of a vehicle, for example, there would be eight (8) motors total. As illustrated, the first motor 24 shown as $M_Y$ moves the air louvers directing airflow up and down and the second motor 25 shown as $M_X$ moves air louvers that direct airflow left and right. In another embodiment shown in FIG. 4, the system 10 may include a third motor 26 that controls the amount of airflow from no airflow to full airflow by moving a damper in the HVAC vent.

Figure 5:
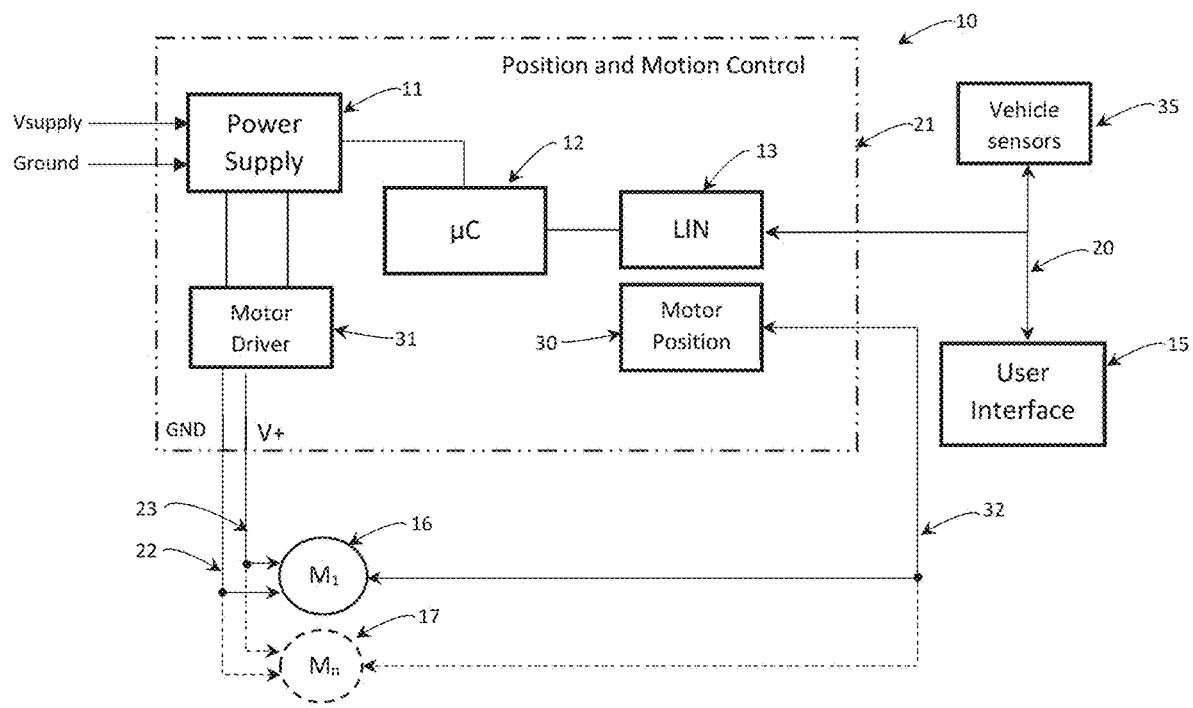
FIG. 5 is a diagrammatic view illustrating a configuration of the system for powering and controlling louver and damper motors in a vehicle HVAC vent system in accordance with another embodiment of the present invention.

The system 10 of FIG. 5 is similar to the system 10 of FIG. 2 with the exception that the position and motion control 21 has a motor position 30 function as well as a motor driver 31 function. The motor position 30 takes the voltages 32 from each of the motors 16, 17 and interprets them to determine the position of each motor 16, 17. By knowing where each motor is, the position and motion control 21 can drive each motor to a desired location by employing the motor driver 31. It should be appreciated that the motor driver 31 provides proper voltages to energize each motor 16, 17 to drive it to a desired position.

Figure 4:
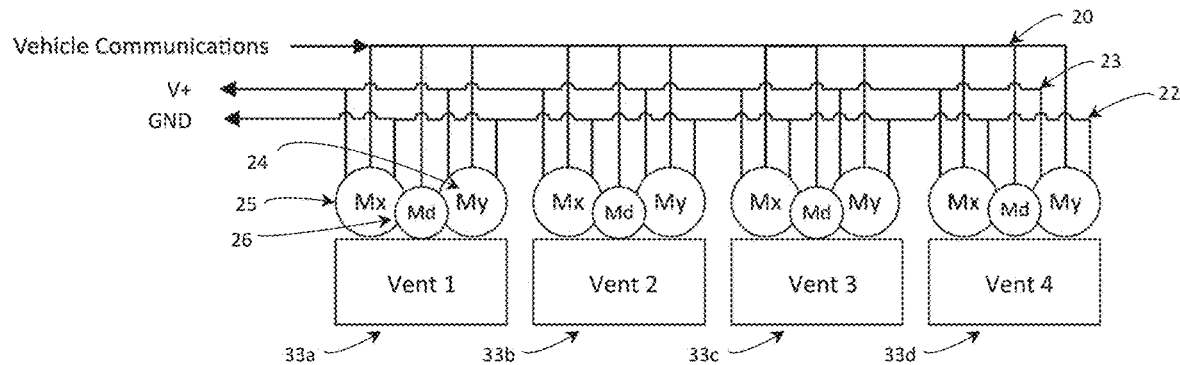
FIG. 4 is a diagrammatic view illustrating another configuration of the system for power and controlling louver and damper motors in a vehicle HVAC vent system in accordance with another embodiment of the present invention.
Figure 6:
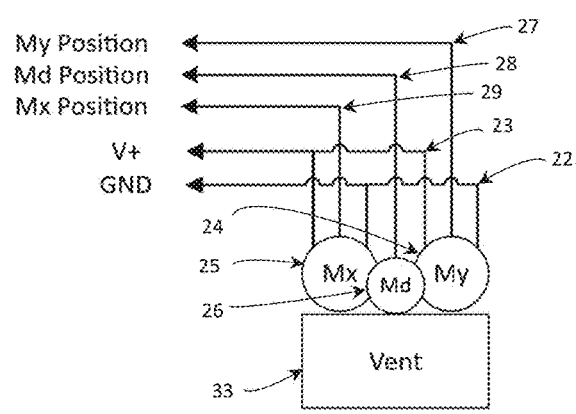
FIG. 6 is a diagrammatic view illustrating a configuration of an HVAC system having three (3) motors on an HVAC vent, each motor having an analog position signal.

Referring to FIG. 6 with continual reference to FIGS. 4 and 5, another embodiment is shown which includes the motors 24, 25, and 26 that move the air louvers and a damper in an HVAC vent 33. Each of the motors 24, 25, and 26 includes an analog output voltage that represents its physical position. The motor 25 (Motor Mx) that positions the air louvers of the HVAC vent 33 in the x-axis or left and right, has an output 29 that provides a voltage that represents where in the full left to right range the louvers are currently positioned. For example, if the motor 25 is in the full left position, the output voltage on Mx position output 29 could be zero (0) volts. And if motor 25 is in the full right position, the output voltage on Mx position output 29 could be five (5)

volts. So, if the position and motion control 21 energizes the motor 25 such that the air louvers are in the middle of its range, an output voltage of 2.5 volts would be present on Mx position output 29. It should be appreciated that the same holds true for the motor 24 (My) with output voltage 27 and the motor 26 (Md) with output voltage 28 whereas instead of left to right or up and down positioning, the motor 26 will travel from the damper full closed position to a damper fully open position.

Referring to FIG. 5, the system 10 includes the vehicle sensors 35 that send information to the position and motion control 21. The vehicle sensors 35 may include thermal sensors such as a thermal camera or discrete temperature sensors. By using thermal sensors, it is possible for the system 10 to determine hot/cold areas of the vehicle cabin. It should be appreciated that, with this information, the HVAC vent 33 could be directed to provide airflow to specific areas by changing the louver position of the HVAC vent 33 and airflow with the goal being to homogenize the temperature throughout the vehicle cabin.

As previously discussed, the system 10 provides the mechanism to move air louvers and damper of the HVAC vent 33 to a desired position. The system 10 may include an oscillating function that will cyclically move the air louvers back and forth in a side to side and/or up and down motion to provide airflow across a predetermined path. This allows for air movement in the vehicle cabin to help homogenize the temperature as well as limiting the time spent in any one direction. For example, an operator may want air to blow on them, but not all the time, which would cause discomfort because the operator would get too cold or too warm. The vehicle cabin may still be too cold/warm, but the operator becomes uncomfortable because air is blowing on them all the time. It should be appreciated that providing oscillatory airflow will allow the vehicle cabin to come to a desired temperature, and maintain that desired temperature, while minimizing operator discomfort.

Further, the system 10 may include intelligence that could be employed by using the vehicle sensors 35 such as a thermal imaging device. The thermal image gathered from the thermal imaging device can be analyzed to determine where an occupant is located, and specifically where their face is located. If an operator's face location is known, the system 10 can cause the air louvers of the HVAC vent 33 to oscillate back and forth and move up and down to avoid direct airflow to their face. Similarly, the air louvers of the HVAC vent 33 can oscillate back and forth to direct airflow, but the damper could be used to slow or stop the airflow to avoid or slow the blowing of air directly on the occupant. An added function that could be employed is to use the thermal imaging camera image to analyze and determine the relative temperature of an individual. For example, if the thermal image reveals that the individual's overall temperature or portions thereof are too warm or cold to expect reasonable comfort, the HVAC vents could be controlled to provide air on the targeted areas at an appropriate temperature to help achieve an individual's comfort. Another added function would be to employ and analyze the thermal image of individuals to make an assessment if the individual is likely to have a fever. It should be appreciated that the system 10 may employ a standard camera instead of, or in addition to, a thermal imaging camera, to find an operator's face to avoid direct airflow to the operator's face.

In one embodiment, the vehicle sensors 35 may include occupancy sensors that provide information to the vehicle about whether a seat is occupied or not. This function has been typically used for turning on the airbag function or as a rear seat reminder that a child is present. However, occupancy sensing can also be employed by the system 10. If a seat, such as for a front passenger is empty, the two HVAC vents typically associated with the passenger position could be closed by energizing the damper motor 26 Md. It should be appreciated that closing off the HVAC vents would provide more airflow for the remaining HVAC vents that are open.

Figure 7:
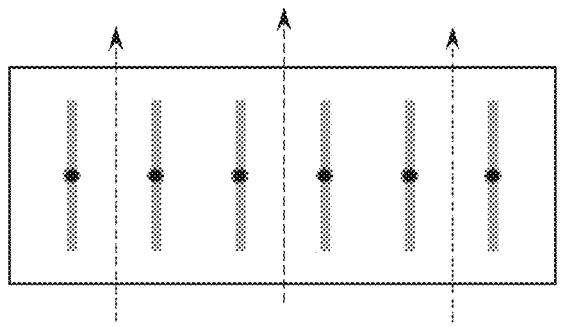
FIG. 7 is a top view illustrating a centered position of louvers for an HVAC vent of the HVAC system.
Figure 8:
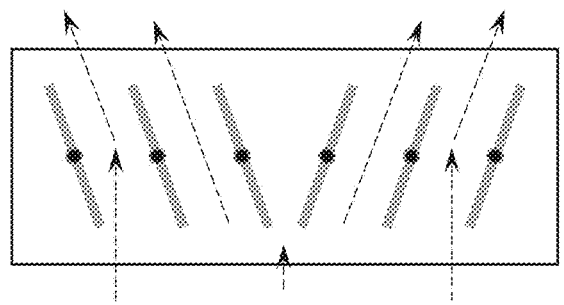
FIG. 8 is a top view illustrating louvers for an HVAC vent of the HVAC system positioned such that airflow is split at a center, half going left with the other half going right.
Figure 9:
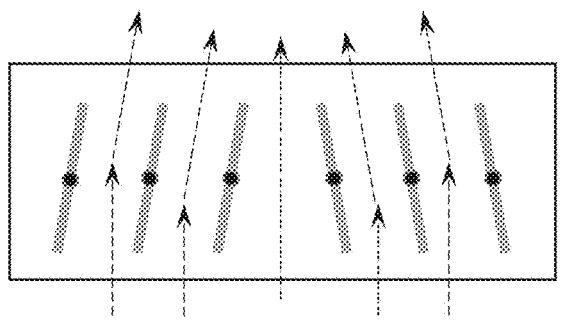
FIG. 9 is a top view illustrating louvers for an HVAC vent of the HVAC system positioned such that airflow is focused toward a center position.
Figure 10:
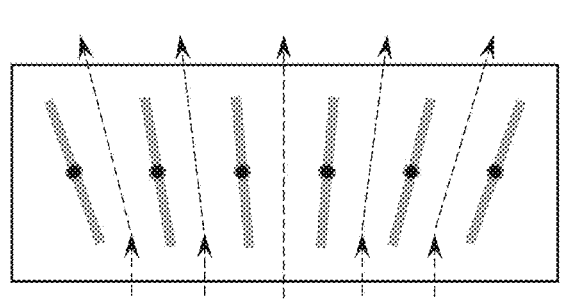
FIG. 10 is a top view illustrating louvers for an HVAC vent of the HVAC system positioned such that airflow is fanned out evenly from a left side to a right side.
Figure 11:
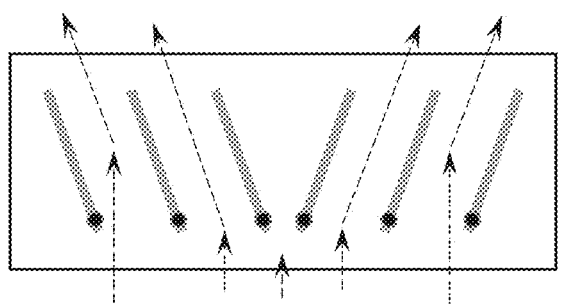
FIG. 11 is similar to FIG. 8 but illustrating a pivot point at an end of the louvers instead of midway.

FIGS. 7-11 show various configurations of air louvers of the HVAC vent 33 that can be employed to change air direction as needed to accomplish homogeneity in air temperature while conforming to user defined flow paths. FIG. 7 shows a standard configuration with the air louvers providing straight through airflow. FIG. 8 shows diverging air louvers to split airflow to the left and right as it exits the HVAC vent 33. FIG. 9 shows converging air louvers to focus airflow into a concentrated flow path. FIG. 10 shows an even diverging airflow path, and FIG. 11 shows a diverging air louvers pattern, but with the air louvers pivoting from an end instead of a centrally located pivot point. It should be appreciated that, while the examples shown in FIG. 7-FIG. 11 are symmetrical about a centerline, they could be non-symmetrical in any advantageous form.

The HVAC vents can be controlled such that airflow, direction and temperature, can be controlled automatically to maintain a desired environment to ensure occupant comfort. For example, HVAC airflow, direction, and temperature can be dynamically controlled without occupant interaction, based on the sun load on the vehicle. If there is direct sunlight coming in the passenger side of the vehicle, airflow can be enhanced on the passenger side to help even out vehicle cabin temperature. Likewise, if the sun is coming in the front or the back of the vehicle, airflow temperature and speed can be automatically changed to provide more or less air to the front or back of the vehicle. By dynamically changing the temperature and flow of air from the HVAC vents, the temperature can be modified quickly. When there is intermittent sun and shade on the vehicle such as on a partly cloudy day, the system 10 can automatically compensate by raising or lowering the temperature and/or speed of the airflow as well as control vent louver position. As previously described, sensors such as sun load sensors, thermal sensors, and/or thermal images can be used singly or in combination to provide information to the system 10 to ensure a consistent and homogeneous environment.

If each HVAC vent 33 has controllable air louvers and dampers to control air direction and flow, the HVAC vents 33 can be adjusted to a user preferred location. For example, if vehicle operator #1 approaches the vehicle with a key fob, the vehicle recognizes the key fob as that of operator #1 and adjusts the air direction and flow to what the operator #1 had previously set the HVAC vents 33 to. It should be appreciated that, likewise, if vehicle operator #2 approaches the vehicle with their key fob, the vehicle will adjust HVAC parameters to what they previously had.

All vent position may also be controlled remotely via a mobile device such as a phone or tablet. As vehicles become more and more automatic on the way to fully autonomous, a further benefit in the exemplary embodiment of the present invention is obtained by the use of a remote device. A vehicle operator may summon their car from the parking lot or their garage to come and pick them up at some location. The mobile device will send out the appropriate commands for the vehicle to start moving toward the operator. The mobile device, having unique ID numbers like the IMEI number, identifies to the vehicle which operator is commanding it to move. It should be appreciated that, as such, the vehicle can adjust all HVAC parameters including vent position and flow, as well as seat position, mirror position, and other parameters.

In addition to temperature, humidity control can also be employed. On days where the air is too dry or humid such that it may become uncomfortable for a person, humidity may be added to, or removed from, the airflow to improve comfort level.

In another exemplary embodiment, the system 10 can not only be used as previously described changing air direction, speed, and temperature, but can also be expanded to provide means of changing and/or augmenting the cabin space environment.

There is ongoing research to sense and use bio-signal recognition to adapt an environment to the mood of a person. For example, automaker KIA and Massachusetts Institute of Technology (MIT) are collaborating to develop technologies that will provide data to control systems that will change environmental factors to meet or alter the mood of individuals. The system 10 includes features that change the overall vehicle occupant environment such that psychological aspects, such as mood, anxiety, stress, and the like, can be modified to improve the well-being of the occupants.

Examples of environmental conditions and/or aspects that can be used include, smell, lighting, sound, temperature, humidity, oxygen content, and outside air intake. If the system 10 senses drowsiness in the driver, vehicle cabin temperature may be lowered, or oxygen could be added to the vehicle cabin air to help increase the driver's alertness. If anxiety or tension is sensed, calming scents could be introduced into the HVAC system, soothing music could play, or noise cancellation employed, lighting may be adjusted, all being done to modify how the occupants feel and improve occupant well-being.

The system 10 can sense and modify other aspects of the vehicle cabin environment such as air quality. Oxygen and/or carbon dioxide gases can be sensed and altered by oxygen insertion or by increasing make-up (outside) air percentage. Air cleanliness can also be sensed and altered by use of a particulate sensor and air filters. If there is a high particle count, such as during high pollen seasons, air filtration can be accomplished by reducing air make-up percentage or by increasing airflow through a filtration system. A filtration system can include pass-through filters or electrostatic cleaners. Air can also be cleaned of bacteria and virus presence by use of UV lighting in an air-flow path.

It should be appreciated that the functions and features listed in the embodiments of the system 10 described above can also be used in a home environment. Home automation implementation is increasing rapidly in many forms including lighting, temperature, window treatment control, and music, as examples. Many home functions can be controlled to provide an environment that will improve the well-being of the occupants. Functions like those mentioned have been integrated into home automation controllers so that computers and mobile devices like phones, tablets, and watches can control their operation. Operation control includes on/off, volume of sound, open/closed, lighting brightness, and the like. Detailed control of home functions provides an immersive environment for the occupant to live. HVAC functions can be controlled to provide even temperature throughout the home or individual rooms/areas at different preferred temperatures. It should be appreciated that air vents/registers can be controllable such that the air can be directed in a desired direction or oscillatory so that there is movement of air over a larger area.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for controlling motorized HVAC vents of an HVAC system comprising:
   at least one motor to move air louvers of an HVAC vent of the HVAC system;
   a position and motion control system for controlling the at least one motor; and
   one or more sensors to detect hot/cold areas and send information on the detected hot/cold areas to the position and motion control system
   wherein the position and motion control system includes a user interface that allows a user to input data and communications to communicate with the one or more sensors and the user interface to obtain data from the one or more sensors, wherein the position and motion control system receives the data from the user interface and the one or more sensors to automatically determine a targeted positioning of airflow based on hot/cold areas of a vehicle cabin and dynamically change a temperature and flow of air from the HVAC vent.

2. The system of claim 1 including a plurality of motors to move the air louvers, wherein the position and motion control system controls the motors.

3. The system of claim 1 including a damper for the HVAC vent, wherein the position and motion control system controls a motor for the damper.

4. The system of claim 1 wherein the position and motion control system includes a motor drive.

5. The system of claim 4 wherein the motor drive is integral to the at least one motor.

6. The system of claim 1 wherein the position and motion control controller includes a power supply to supply power to the at least one motor.

7. The system of claim 1 including a first motor for positioning the louvers of the HVAC vent in an x direction and a second motor for positioning the louvers of the HVAC vent in a y direction.

8. The system of claim 7 including a third motor for positioning a damper of the HVAC vent.

9. The system of claim 8 wherein the first motor, second motor, and third motor are mounted on the structure of the HVAC vent.

10. The system of claim 1 wherein the user interface allows the user to control one or more functions and accessories.

11. The system of claim 1 wherein the at least one motor has integral electronics that can interpret communications instructions from the communications as to what position the louvers should move to, whereby the position and motion control system receives input from the user interface and, as a result, sends a command via the communications to the at least one of motor.

12. The system of claim 1 including a thermal sensor to detect the hot/cold areas and produce a thermal image to send to the position and motion control system.

13. The system of claim 12 wherein the thermal sensor is a camera.

14. The system of claim 12 wherein the thermal sensor is a temperature sensor.

15. The system of claim 13 wherein the thermal image from the thermal sensor determines where an individual is located.

16. The system of claim 15 wherein the position and motion control system analyzes the thermal image and determines a relative temperature of an individual.

17. The system of claim 1 wherein the position and motion control system includes at least one of the one or more sensors is for individual detection for airflow avoidance or minimizing airflow on an individual.

18. The system of claim 1 wherein the HVAC vent is dynamically controlled to change between air temperature and airflow based on the sun load.

19. The system of claim 18 wherein the position and motion control system includes at least one of the one or more sensors to detect sun load and provide more airflow on an individual and/or cooler temperatures due to the sun load on the individual, more airflow either on a front or back of the individual based on the sun load in the front or back, or more airflow on the individual based on cloud cover.

20. The system of claim 1 including a user key fob, wherein the HVAC vent is adjusted to a user preferred location based on recognition of the user key fob.

21. The system of claim 1 wherein a position of the HVAC vent is controlled by the position and motion control system remotely via a mobile device.

22. The system of claim 1 wherein the position and motion control system includes at least one of the one or more sensors to detect humidity and adds or removes humidity to the airflow to improve comfort level.

23. The system of claim 1 wherein the position and motion control system oscillates the louvers for oscillation of airflow direction.

24. The system of claim 1 wherein the position and motion control system oscillates the louvers for oscillation of an amount of airflow.

25. The system of claim 1 wherein the at least one motor is one of a stepper motor and servo motor.

26. The system of claim 1 wherein the one or more sensors detect psychological aspects of an individual and the position and motion control system adjusts the airflow on the individual.

27. The system of claim 26 wherein the psychological aspects comprise an occupant's mood.

28. The system of claim 1 wherein the one or more sensors detect environmental conditions of at least one of smell, lighting, sound, temperature, humidity, oxygen content, and outside air intake.

29. The system of claim 1 wherein the one or more sensors detect drowsiness in an individual and the position and motion control system lowers the airflow temperature and/or adds oxygen to the airflow to help increase the individual's alertness.

30. The system of claim 1 wherein the one or more sensors detect anxiety or tension in the individual and the position and motion control system adds scents into the airflow to calm the individual, soothing music played or noise cancellation employed, lighting adjusted, all being done to modify how the an individual feels.

31. The system of claim 1 wherein the one or more sensors detect air quality of the airflow and modify the airflow to improve the air quality.

32. The system of claim 31 wherein the air quality is modified by one of oxygen insertion, increased make-up outside air percentage, and use of air filtration.

33. The system of claim 31 wherein the air quality is modified by removing bacteria and virus presence by use of UV lighting in a path of the airflow.

34. A method for controlling motorized vents of an HVAC system of a vehicle comprising steps of:
moving at least one motor to move air louvers of an HVAC vent of the HVAC system;
controlling, by a position and motion control system, the at least one motor; and
detecting, by one or more sensors, hot/cold areas and sending information on the detected hot/cold areas to the position and motion control system, wherein the position and motion control system includes a user interface that allows a user to input data and communications to communicate with the one or more sensors and the user interface to obtain data from the one or more sensors, wherein the position and motion control system receives the data from the user interface and the one or more sensors to automatically determine a targeted positioning of airflow based on hot/cold areas.

35. A method for controlling motorized vents of an HVAC system of a vehicle comprising steps of:
moving at least one motor to move air louvers of an HVAC vent of the HVAC system;
controlling, by a position and motion control system, the at least one motor; and
detecting, by one or more sensors, hot/cold areas and sending information on the detected hot/cold areas to the position and motion control system, wherein the position and motion control system includes a user interface that allows a user to input data and communications to communicate with the one or more sensors and the user interface to obtain data from the one or more sensors, wherein the position and motion control system receives the data from the user interface and the one or more sensors to determine a targeted positioning of airflow based on hot/cold areas; and wherein the position and motion control system automatically initiates movement of the air louvers.

36. A method for controlling motorized vents of an HVAC system of a vehicle comprising steps of:
moving at least one motor to move air louvers of an HVAC vent of the HVAC system;
controlling, by a position and motion control system, the at least one motor; and
detecting, by one or more sensors, hot/cold areas and sending information on the detected hot/cold areas to the position and motion control system, wherein the position and motion control system includes a user interface that allows a user to input data and communications to communicate with the one or more sensors and the user interface to obtain data from the one or more sensors, wherein the position and motion control system receives the data from the user interface and the one or more sensors to determine a targeted positioning of airflow based on hot/cold areas; and wherein the position and motion control system dynamically controls movement of the air louvers.

\* \* \* \* \*